UNITED STATES PATENT OFFICE.

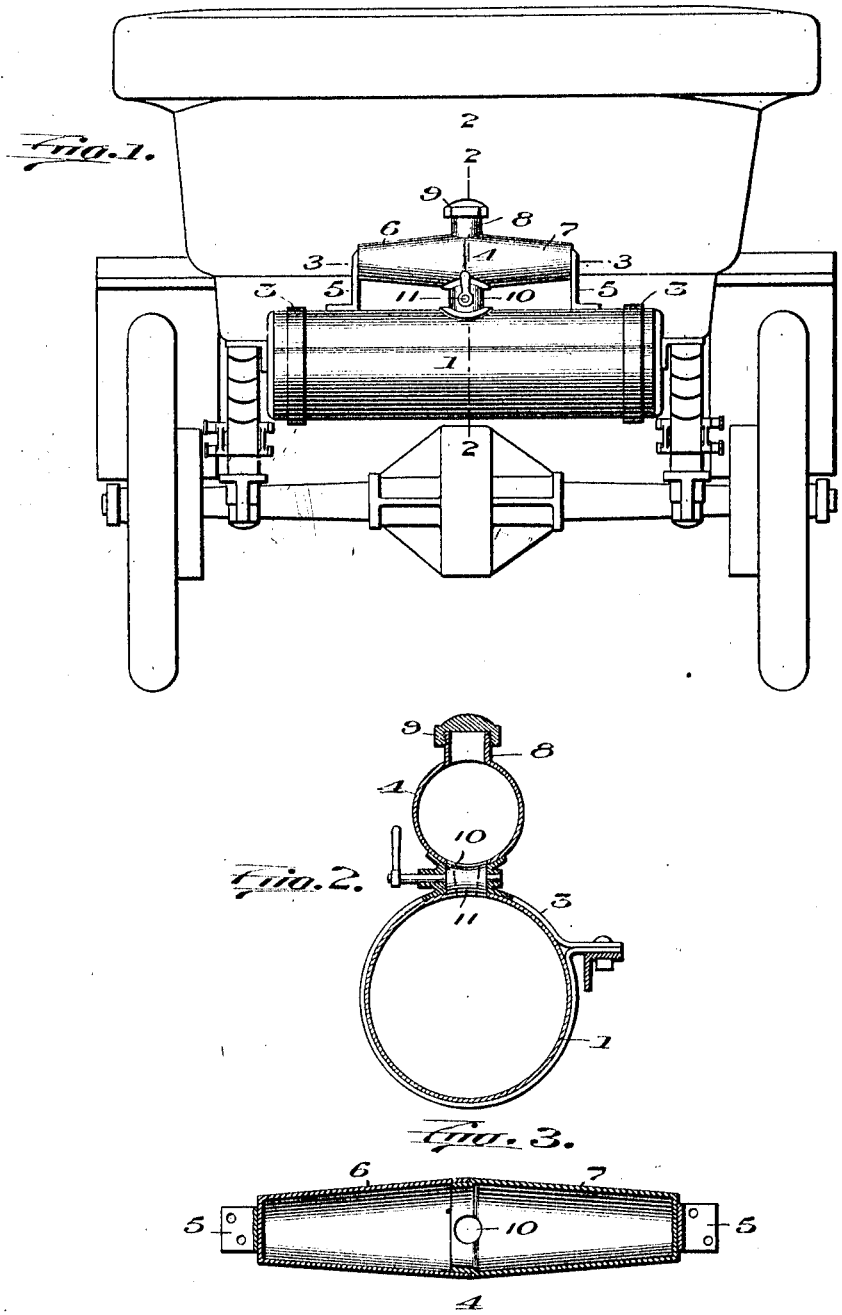

GEORGE L. PRATT, OF ATLANTA, GEORGIA, ASSIGNOR TO MARGARET L. PRATT, OF ATLANTA, GEORGIA.

MEASURING DEVICE.

1,313,731.     Specification of Letters Patent.     Patented Aug. 19, 1919.

Application filed November 10, 1916. Serial No. 130,622.

*To all whom it may concern:*

Be it known that I, GEORGE L. PRATT, a citizen of the United States, residing at Atlanta, in the county of Fulton and State of Georgia, have invented certain new and useful Improvements in Measuring Devices, of which the following is a specification, reference being had therein to the accompanying drawing.

This invention relates to measuring devices.

The invention contemplates the provision of a measuring tank or receptacle in conjunction with a main fuel-receiving tank of an automobile or the like. Its primary object is to provide means, under the control of the purchaser or at the receiving end, whereby the accuracy of amount of fuel delivered to the main tank may be easily and quickly determined.

Pumps, automatic and other distributing agencies for gasolene now in use, frequently give short measure. This may be due to the fact that valves, pistons, or other parts of the apparatus become worn and leaky; the operator may not give a full stroke to the pump-piston; the flexible hose may drain back to the supply tank by suction, etc. Tank gages are also subject to mechanical defects which render them inaccurate. Standard measuring vessels in which the gasolene is filled and poured are not protected against the danger of the contents being accidentally ignited.

Measuring receptacles of known capacity which could be certified by a duly authorized officer, and placed in communication with the main fuel tank of an automobile, for instance, would positively eliminate any question of short measure. This measuring or auxiliary tank should preferably be of a shape which could not materially affect its contents by distortion of the sides, or by the level of the vehicle to which it is attached, and all of these desirable features are within the objects of the present invention.

Still further objects are to produce a closed receptacle having a comparatively small filling opening, whereby danger of ignition is reduced to a minimum; to place the device within easy and accessible relation to the main fuel tank; and to provide means whereby the contents may be quickly transferred from the measuring tank to the fuel tank.

Other advantages will in part be apparent and in part brought out in the description which follows.

A drawing illustrating a preferred embodiment of the invention is hereto appended, in which:—

Figure 1 is a view in elevation showing an application of the invention to an automobile fuel tank;

Fig. 2 is a cross sectional view on the line 2—2, Fig. 1; and

Fig. 3 is a similar view on line 3—3, Fig. 1.

In these drawings, the numeral 1 designates a main fuel tank, shown for convenience of illustration as secured to an automobile body 2, as by suitable supports 3.

An auxiliary or measuring tank or receptacle 4 of known and preferably certified capacity, is associated with the main fuel tank in any convenient manner, and is here shown mounted in brackets or supports 5 carried by the main tank.

This auxiliary tank is preferably of a shape which will not effect reduction of its contents due to distortion of the sides, or such that it will not be necessary to maintain it at an accurate level in order to hold a definite quantity of liquid. To this end, it comprises two truncated cone-shaped portions 6 and 7, jointed at their inner ends, and secured at their outer ends in the brackets or supports 5.

A filling opening 8 is provided in this tank, normally closed by a threaded cap 9 in the usual manner. To provide for complete drainage of the measuring tank or receptacle and a quick transfer of its contents to the main tank, a passage 10, of large dimension is provided, and through which the tanks are in communication, and in this passage or pipe there is placed a valve or cock 11.

While the component parts of the measuring tank are here shown in the form of truncated cones, it will be understood that equivalent construction such as pyramids, or polygonal sided instrumentalities might be used, the general object sought being to have a portion lower than the rest to insure drainage; a shape which will not lend itself readily to distortion; and wherein accurate level of the tank is not necessary to insure accuracy of its measurement.

It will be apparent that many changes may be made in the general construction and arrangement of the parts without departing from the main principles of the invention or sacrificing its chief advantages.

What I claim is:

1. The combination with a main receiving and storing tank, of an auxiliary measuring and filling tank, said filling tank being of predetermined capacity and including a body-portion comprising frusto-conical members joined at their bases and closed at their opposite ends; a filling-instrumentality for the measuring and filling tank; and means for transferring the contents of the filling tank to the main receiving and storing tank, said means comprising a conduit of comparatively large interior diameter, connected to the measuring tank at the point of juncture of the bases of the frusto-conical members, and at its opposite end with the main receiving and storing tank.

2. The combination with a main receiving and storing tank, of an auxiliary measuring and filling tank, said filling tank being of predetermined capacity and including a body-portion comprising frusto-conical members joined at their bases and closed at their opposite ends; a filling-instrumentality for the measuring and filling tank including an opening and closure therefor; means for transferring the contents of the filling tank to the main receiving and storing tank, said means comprising a conduit of comparatively large interior diameter, connected to the measuring tank at the point of juncture of the bases of the frusto-conical members and at its opposite end with the main receiving and storing tank; and a valve disposed in said conduit.

In testimony whereof I affix my signature in presence of two witnesses.

GEO. L. PRATT.

Witnesses:
JESSE M. CHAFFIN,
N. P. PRATT.

Copies of this patent may be obtained for five cents each, by addressing the "Commissioner of Patents, Washington, D. C."